United States Patent Office 3,531,620
Patented Sept. 29, 1970

3,531,620
ARC WELDING ELECTRODE FOR STEEL WITHOUT USING GAS OR THE LIKE
Masayasu Arikawa, Fujisawa-shi, Izumi Ichihara, Kamakura-shi, and Shou Horiuchi, Fujisawa-shi, Japan, assignors to Kobe Steel Ltd., Fukiai-ku, Kobe, Japan
Filed June 30, 1967, Ser. No. 650,319
Claims priority, application Japan, July 8, 1966, 41/44,710
Int. Cl. B23k 35/22
U.S. Cl. 219—146     8 Claims

ABSTRACT OF THE DISCLOSURE

The present invention relates to a continuous and consumable electrode being used for automatic arc welding of steel without using shielding gas or the like. The structure of said electrode comprises a steel casing filled with a powder of special composition, said powder improving the efficiency of arc welding of steel.

BACKGROUND OF THE PRESENT INVENTION

There are many methods for welding steel automatically and such methods as gas shielded-arc welding using carbonic acid gas or inert gas as shielding gas and submerged arc welding using flux for shielding are well-known. There are other methods such as electro-slag welding etc. These automatic welding methods have in common the point that they use continuous coiled steel wire as a consumable electrode and melt said electrode into molten metal under protection from the ambient atmosphere.

It is well-known in the art that oxygen and nitrogen have bad effect in welding. In the prior art of visible arc welding, said bad effect was avoided by introducing a shielding gas which had little or no reaction with molten steel to shield the arc stream. The use of a shielding gas, however, has a serious defect in that the effect of shielding is lost if the wind is blowing 2 meters per second or more and thus tending to unable to achieve good welding.

A few recent reports relating to developments in welding mention a consumable electrode requiring no shielding gas supply from the outside. The welding process without using shielding gas heretofore employed is either a process which makes harmless, by adding some special element, the nitrogen that inevitably penetrates into the weld from the ambient atmosphere, or a process using an electrode which includes some material having a shielding effect.

The consumable electrodes used in the afore-mentioned process, however, have several disadvantages in practical use. Therefore those working in the field of welding have long desired to have a more effective electrode for this purpose.

EXPLANATION OF PRIOR ART IN SIMILAR CATEGORY (1) The best example of a process for arc welding in the ambient atmosphere without using shielding gas or the like is specifically disclosed in U.S. patent specification No. 2,909,778. In this process a killing agent and killing agent protector is supplied into a portion of the welding arc, said killing agent having favorable effect on molten metal and said killing agent protector serving to protect said killing agent from oxygen and nitrogen of the ambient atmosphere. This process uses an electrode comprising a metal casing filled with deoxidizer, killing agent and killing agent protector. Mn, Cr, Nb, Ta and V etc. are preferably used as killing agent and an aluminum fluoride, alkali halide or alkaline earth metal halide is preferably used as the killing agent protector. With this process it is possible to obtain fusion joint metal of low porosity; however, by using just a fluoride it is difficult to prevent penetration of oxygen and nitrogen into the molten metal from the ambient atmosphere and, thus, to obtain fusion joint metal without porosity, and, further, much killing agent always remains in said fusion joint metal.

The existence of much killing agent such as Al, Ti, Zr etc. in the molten metal, will naturally cause reaction of these elements with oxygen and also with nitrogen. Also, the each specific gravity of ZrN, TiN, AlN etc. is high and the melting point of each of them is also high; therefore, once these compounds are produced in the molten pool, there is little possibility for "slag off" and these compounds remain as non-metallic inclusions thereby reducing the ductility of the fusion joint metal and the ductile strength in the notch portion thereof thus resulting in an unsuitable weld joint of the important structure. The above are the main reasons for the limited use of this type electrode.

(2) Another welding process which does not use shielding gas or uses said gas in reduced volume is disclosed in U.S. patent specification No. 3,118,053. The embodiment disclosed in said specification is an electrode which is a compound wire with flux containing carbonate of lime as gas generatng agent. With the fusioning of this electrode, said carbonate of lime will generate gas by heat decomposition and said gas is utilized for shielding. However, it is not enough to use merely gas generating agent only, because the decompositioning reaction progresses so rapidly in the arc stream, in case of using normal compounding processed wire, that the pressure resulting from said generated gas causes disturbance of the arc stream and thus the tendency to increase nitrogen inclusion in the fusion joined steel was ensured.

OBJECT OF THE PRESENT INVENTION

A first principal object of the present invention is to provide a consumable electrode which makes it possible to obtain fusion joint metal in good quality by arc welding of steel in the ambient atmosphere without using shielding gas or the like.

Another object of the present invention is to provide an electrode without the defects inherent in the prior art of welding performed in the ambient atmosphere.

Another important object of the present invention is to provide a consumable electrode with which it is possible to obtain a fusion joint metal that will meet high standards with respect to both X-ray examination and mechanical properties when used for arc welding of steel in the ambient atmosphere without using shielding gas or the like.

Another object of the present invention is to provide a welding electrode which makes the welding process easy and which can be used with either D.C. or A.C. current.

FEATURES OF THE PRESENT INVENTION

The aforementioned objects are achieved by the present invention which provides a composite type consumable electrode comprising a steel casing filled with three or more components in powdered form. It is essential that said powdered components include three major indispensable items, namely metal fluoride, metal carbonate and denitrodizing element. Said "metal fluoride" includes more than one kind of alkali fluoride, alkaline earth metal fluoride, rare earth metal fluoride, aluminum fluoride or titanium fluoride. Said "metal carbonate" includes more than one kind of alkali carbonate or alkaline earth metal carbonate. Said "denitrodizing element" includes more than one kind of Mg, Al, Ti, Zr or an alloy thereof. If said steel casing is filled with a combination of the aforementioned three components in powder form, high quality fusion joint metal is certain to be obtained by arc welding in the ambient atmosphere. Said three components function cooperatively to make the welding operation easy even if the electrical source is A.C. and a high quality weld is always produced.

In use, the metal casing of the consumable electrode of the present invention fuses and becomes part of the weld metal at the time said electrode is melted by the electric arc and the denitrodizing element included in said powder filler inside of said casing enters into the arc and effectively protects the molten metal from nitrogen which might have a bad effect on the weld while the metal fluoride and metal carbonate generate gas or vapor which surrounds and effectively shields the electric arc thereby making it possible to weld the steel steadily and easily with little inclusion of nitrogen.

The individual effect of said three components will now be explained. When said electrode is melted the metal fluoride vaporizes and the gas covers the melted portion thereby closing it off from the ambient atmosphere to reduce contact with oxygen and nitrogen in the air. Also some part of said metal fluoride naturally comprises the effective slag forming agent. To get the aforementioned effect, it is necessary that the fluoride make up at least 10% by weight of said powdered composition. If the proportion of said fluoride is less than 10%, the effect desired may not be obtained regardless of the proportion of metal carbonate. On the other hand, if the proportion of said fluoride in said composition is increased to over 70%, it may prevent fluxing. Therefore, the proportion of metal fluoride recommended is within the range of from 10% to 60%. Among said metal fluorides, $CaF_2$ ranging from 30% to 60% or a mixture of $CaF_2$ and $AlF_3$ is especially effective. In the case of said mixture the $CaF_2$ should make up 30% to 55% and the $AlF_3$ 5% by weight of the total powdered composition The purpose of including metal carbonate in said powdered composition is to utilize the carbonic acid gas released from said metal carbonate upon decomposition thereof. Said carbonate decomposes upon melting of said electrode and the carbonic acid released combines with the gas of the vaporized metal fluoride to shield the weld point from the ambient atmosphere. The carbonate differs from the fluoride in decompositioning reaction and it generates gas very quickly. Therefore, if too much carbonate is included in the composition, it increases spattering and is not suitable for practical use. Accordingly, the preferred proportion of metal carbonate is within the range of from 5% to 25%, and $CaCO_3$ and/or $MgCO_3$ are especially useful as the metal carbonate.

However, if we include only those materials which serve to shield the weld point from the ambient atmosphere, the composition will be incomplete in that it will not prevent penetration of nitrogen into the fusion joint metal. Nitrogen in the fusion joint metal has a bad effect on internal grain structure, as disclosed by X-ray examination and also on mechanical properties. To avoid this unfavorable result, the present invention adds denitrodizing agent to said powder in proportions ranging from 10% to 50%. As the denitrodizing agent, a metal that reacts strongly with nitrogen, Ti, Zr, Al, Mg, etc. is preferably selected. These elements also react strongly with oxygen, and, therefore they also act as a deoxydizing agent. Any of these denitrodizing elements may be used alone. However, alloys of these elements such as Al-Mg, Ca-Si-Al or ferrous alloy type such as Fe-Ti, Ca-Si-Zr, Fe-Zr, Fe-Al are also employed. The amount of denitrodizing agent used, either single element type or alloy type should be enough to insure satisfactory denitrodizing action and is decided after considering the influence of said agent on the fusion joint metal.

For achieving the desired purpose, the proportion of denitrodizing agent in said powdered composition should be at least 10% but not more than 50% by weight. If Mn or Si is added to the denitrodizing agent as deoxidizing agent, about half volume of said deoxidizing agent may be replaced with purely a deoxidizing agent, because the deoxidizing agent included in the whole powder defined as denitrodizing agent may reduce the volume of oxygen by its deoxidizing function thereby reducing the oxidizing consumption of said denitrodizing agent. For denitrodizing agent, the use of Al-Mg alloy in the range of from 10% to 30% is especially recommended.

The present invention does not rely upon the independent functioning of each component, metal fluoride, metal carbonate and denitrodizing element. The characteristic feature of the present invention is in the combined functioning of said three components. That is to say, each of said three components influences the others. For example, if the quantity of metal carbonate is fixed and metal fluoride is employed, within the allowable range, the quantity of denitrodizing element may be reduced because of the shielding effect of said metal fluoride. On the other hand, too much fluoride will have an unfavorable effect on the weld, and consideration of this fact relates to the introducing of carbonate. Similarly, if the amount of fluoride is fixed and the amount of carbonate is being varied, the amount of denitrodizing element to be included may be approximately constant. The reason for this is that some part of the $CO_2$ generated by the decompositioning of said carbonate will be further broken down into CO and O due to the high temperature. At this point, the $CO_2$ protects the molten metal from the ambient atmosphere thereby avoiding an increase in the quantity of nitrogen, and said O generated by the breaking down of part of the $CO_2$ will oxidize the excess denitrodizing element thereby reducing further the amount of nitrogen in solidified fusion joint metal. As explained above, to the well-known method disclosed in said U.S. Pat. No. 3,118,053, carbonate in combination with fluoride increases remarkably the degree of protection given molten metal from the ambient atmosphere, especially from nitrogen, and also decreases the quantity of denitrodizing element required thereby reducing inclusions in the weld. Tests proved the existence of 0.035% nitrogen in the fusion joint metal produced by the process without including carbonate, whereas only 0.012% nitrogen was present in case of the process which included the proper amount of carbonate.

As specifically disclosed above, the distinguishing feature of the present invention is that it reduces the amount of denitrodizing element included in the fusion joint metal thereby making it possible to obtain fusion joint metal of superior ductile strength in the weld, notch portion.

The aforementioned combination of metal fluoride, carbonate and denitrodizing element makes up the main part of the powder filling said steel casing. However, said powder may include as auxiliary components, other powders in proper amount. For example, it may include elements to be used for alloys such as Mn, Ni, Cr, Mo, B, V and W, ferrous powder, a deoxidizing agent such as Mn or Si, or such normal welding fluxes as $SiO_2$, $ZrO_2$, $Al_2O_3$, MgO, MnO, $MnO_2$, $K_2O$, $Na_2O$, and CaO. In any case the mixture of said metal fluoride, carbonate and denitrodizing element must comprise at least 30% by weight of the finished powder composition.

Said powdered composition is then put into said steel casing. Said powdered composition should comprise 10% to 40% (by weight) of the finished electrode.

The reason why said powder composition must comprise 10 to 40 percent of the electrode is to insure satisfactory covering effect from the fire without using shielding gas or the like in open condition and to assure enough of said powder to avoid bad effect on the welding operation. The reason why the combination of said metal fluoride, carbonate and denitrodizing element should comprise 30% or more of the total powder is to obtain high quality fusion joint metal if the combination comprises less than 30% of said mixture, it results in a poor quality weld.

The powder in said steel casing may be divided into two parts, an outside layer and inside core. In this case, the total weight of said inside core and outside layer should be from 10 to 40% of the total weight of said consumable electrode. The powder of the outside layer is arranged to form a cylinder surrounding said inside powder core and extending approximately the entire length of said electrode. The weight of the powder in said outside layer can range from 30% thru 80% of the total weight of the powder. At least 30% of the total weight of the powder must consist of the following components in proportions as indicated:

|  | Percent |
|---|---|
| Metal fluoride | 10–60 |
| Metal carbonate | 5–25 |
| Denitrodizing element | 10–50 |

This powder is distributed in the outside layer and inside core in the following relationship:

Metal fluoride
Metal carbonate
Inside core powder≦outside layer powder denitrodizing agent
Inside core powder≧outside layer powder That is to say, more protection is given the arc by putting a higher proportion of metal fluoride and metal carbonate in the outside layer than in the inside core. On the other hand, it is advisable to exhibit the effect of the denitrodizing element inside of said shielding atmosphere. Unfavorable results are attained when the percentage by weight of metal fluoride and metal carbonate included in the inside core is more than that of the outside layer or the percentage by weight of denitrodizing element included in the outside layer is more than that of the inside core.

The steel casing of the present invention may be any structure suitable for containing said powdered composition.

Figure 1:
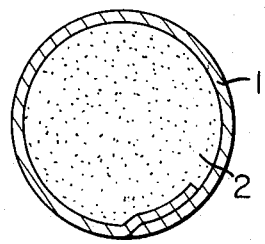
Figure 2:
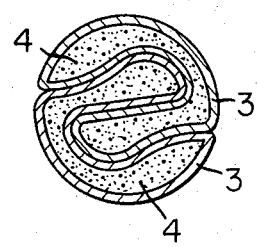

The embodiment of FIG. 1 represents a generic case in which a cylindrical steel casing 1 is filled with powder 2. The embodiment of FIG. 2 shows a construction in which two casings have been joined to form a single body member, each casing being filled with powder 4. Other constructions, for example, folding said steel casing partially, to produce a fin inside of said casing, are also useful.

Figure 3:
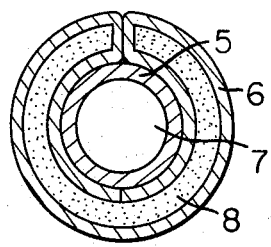
FIGS. 1 through 5 show enlarged cross sectional views of various embodiments of the electrode.
Figure 4:
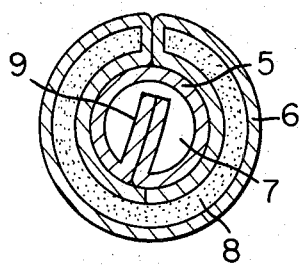
Figure 5:
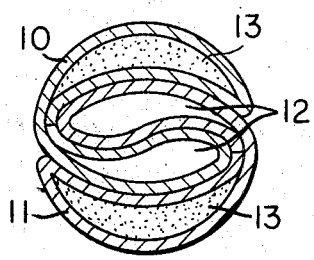

FIGS. 3 through 5 show other constructions in which the powder in the casing is divided into two parts, namely outside layer and inside core. In the embodiment of FIG. 3 steel cylindrical tube 5 is surrounded by double cylindrical steel tube 6, the inside powder 7 of cylindrical steel tube 5 being filled with powders 7 and 8 and the gap between the outer tube and the inner tube of said cylindrical tube 6 also being filled with powders 7 and 8. FIG. 4 shows an embodiment similar to that of FIG. 3, but having fin 9 inside steel cylinder 5. In the embodiment of FIG. 5 two concaved sectional shaped steel tubes 10 and 11 are joined to form the single circular sectioned member, half of each tube entering each other, each half of said tubes being filled with powders 12, 12, 13 and 13 respectively. It should be noted that the composition of said inside core powders 7 and 12 and said outside layers 8 and 13 is sometimes identical and sometimes different, as previously explained.

DATA OF SYNERGISTIC EFFECT BY USING METAL FLUORIDE, CARBONATE AND DENITRODIZING ELEMENT

Figure 6:
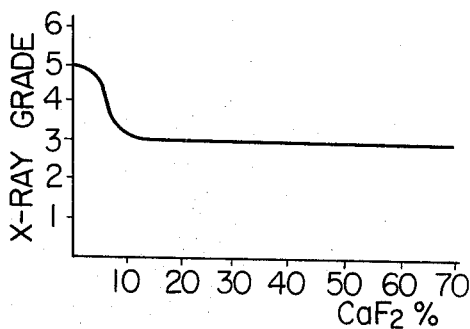
FIGS. 6 through 12 are graphs showing the results obtained by varying the composition of said powder.

Flux composition (A) was prepared to the formula given below. Then metal fluoride, carbonate and denitrodizing element in powder form are added to said (A), individually or in combination. Then a composite electrode comprising a steel casing, plus flux (A) plus some other agent as explained above, was produced. The weight of all powder in said electrode was approximately 20% of the total weight of said electrode. The articles which were welded by using said electrodes were examined visually and by X-rays. The results of said examination are illustrated in FIG. 6 and subsequent drawings. The X-ray examination was based on JIS-Standard; grade 1 shows the most stable status and grade 6 shows that the weld is highly porous.

| Flux A: | Percent by weight |
|---|---|
| Fe-Mn | 10–30 |
| $TiO_2$ | 0–40 |
| $SiO_2$ | 3–20 |
| MgO | 3–15 |
| $Al_2O_3$ | 3–6 |
| $K_2O$ | 0–1 |
| $Na_2O$ | 0–1 |
| Ferrous powder | 0–30 |

Figure 7:
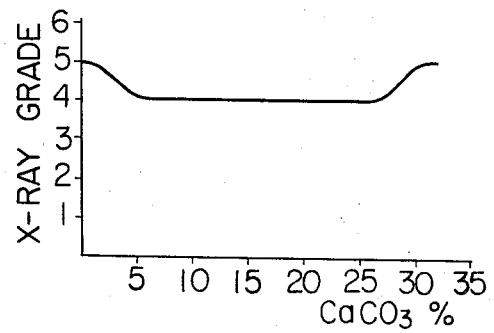
Figure 8:
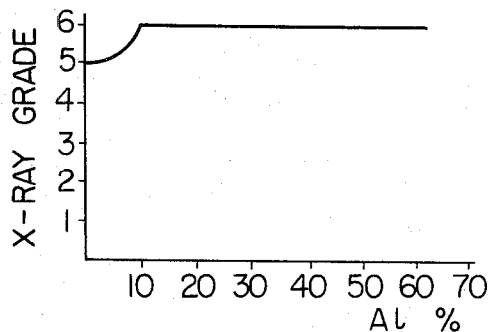

FIG. 6 shows the weld in which only fluoride ($CaF_2$) was added to A in various amounts; the X-ray examination shows a defective weld when more than 10% fluoride is included. FIG. 7 indicates the weld in which only carbonate ($CaCO_3$) was added and the X-ray examination shows a defective weld when said carbonate is included in the range of 4% through 25%. FIG. 8 indicates the weld in which only denitrodizing element was added and the weld is not satisfactory. We can conclude from the aforementioned facts, that addition of fluoride or carbonate alone does not result in a satisfactory weld, and addition of denitrodizing element alone results in a poor weld.

Figure 9:
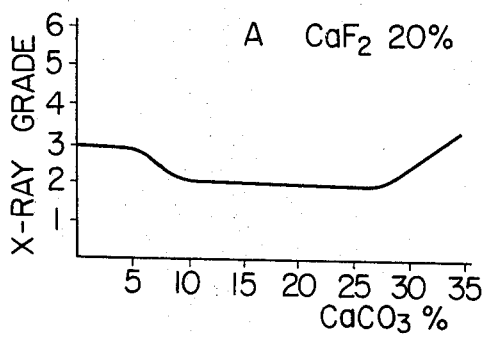
Figure 9:
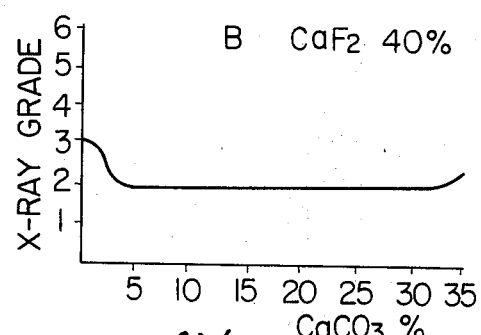
Figure 10:
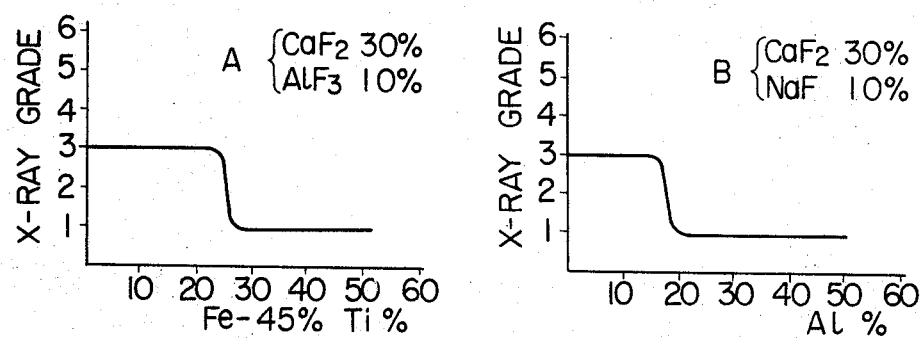
Figure 11:
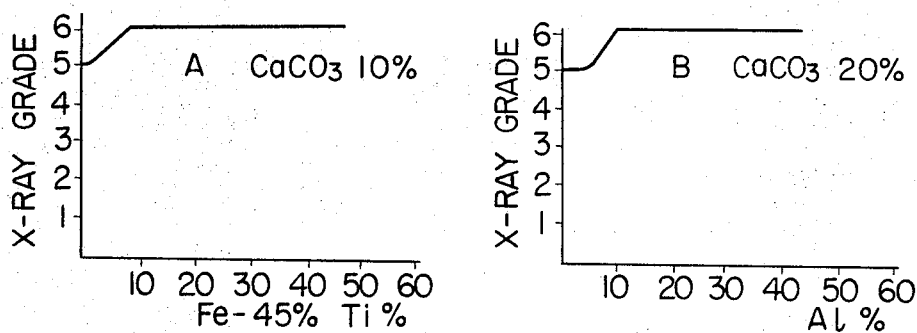

On the other hand, addition of fluoride ($CaF_2$) and carbonate ($CaCO_3$) in combination results in a weld as illustrated in FIGS. 9A and 9B, and the quality of the weld is improved up to X-ray grade 2; however, further improvement is scarcely expected merely by increasing the fluoride content. (Refer to B of the same drawing.) Referring to FIGS. 10A and 10B showing the weld made when both fluoride ($CaF_2$, $AlF_3$, NaF) and denitrodizing element (Al, Fe-Ti) were added to said flux (A), it is noted that a weld of X-ray grade 1 could be obtained by adding a large amount of deoxidizing and denitrodizing element. A large amount of deoxidizing and denitrodizing element is required to cover the weld point completely from the ambient atmosphere. However, too much of said element remarkably reduces the ductile strength of the weld. And if a large amount of carbonate ($CaCO_3$) is added to said flux (A) the deoxidizing and denitrodizing element may not work effectively. (Refer to FIGS. 11A and 11B.) It should be understood that using only two of three components, metal fluoride, carbonate and denitrodizing element, will never result in favorable effect.

Figure 12:
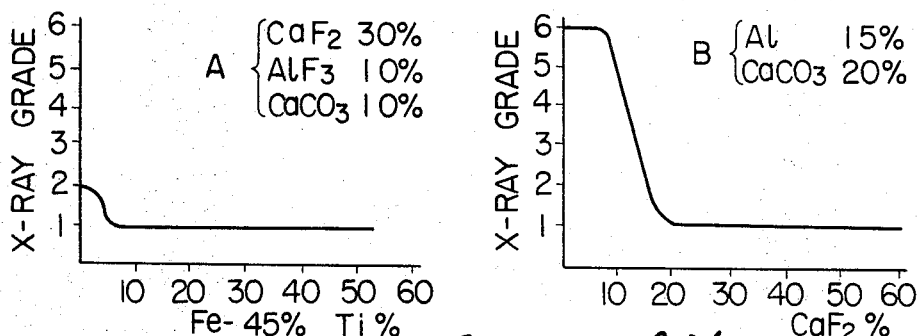

FIG. 12 shows the result of the present invention. According to this invention, good fusion joint metal is obtained by the synergistic effect of said three components. The fusion joint metal obtained in this case is grade 1 in X-ray examination, the amount of included nitrogen is low and, it has enough ductile strength. Accordingly, the value of the present invention in the industrial field should be clearly recognized.

EMBODIMENTS

Example 1

A composite electrode similar to that of FIG. 1 was used. A cylindrical casing 3.2 mm. in diameter was made of mild steel sheet 0.4 mm. thick and said casing was filled with powder of the following composition.

| | Percent |
|---|---|
| Rare earth metal fluoride | 5 |
| $CaF_2$ | 33 |
| $CaCO_3$ | 15 |
| MgO | 6 |
| Mn-Powder | 5 |
| Ca-Si | 6 |
| Mg-Powder | 6 |
| Fe-Powder | 22 |

The weight of the above powder was 33% of the total weight of the metal portion. Lanthanum fluoride, selenium fluoride and neodynium fluoride were used as the rare earth metal fluorides.

Rimmed steel plate 12 mm. thick was used as the base metal. One weld was laid on each surface using 450 a. and 28 v. The results were as follow.

Chemical composition of fusion joint metal:

| | Percent |
|---|---|
| C | 0.12 |
| Mn | 0.67 |
| Si | 0.25 |
| N | 0.015 |

Impact strength: 7 kg.-m./cm.$^2$.

No pit and blow holes were observed and the result of the bending test was also satisfactory.

Example 2

Under conditions similar to those in Example 1, the doubled casing composite electrode of the type shown in FIG. 3 filled with powder of the following composition was employed for welding and the results are as noted below.

| | Percent |
|---|---|
| $CaF_2$ | 50 |
| $MgCo_2$ | 10 |
| $CaCO_3$ | 10 |
| Fe-Mn | 4 |
| Fe-Zr | 8 |
| Fe-Ti | 6 |
| Fe-Al | 6 |
| $K_2O$ | 2 |
| $SiO_2$ | 4 |

Chemical composition of fusion joint metal:

| | Percent |
|---|---|
| C | 0.13 |
| Mn | 0.78 |
| Si | 0.20 |
| Ti | 0.03 |
| Zr | 0.01 |
| Al | 0.04 |
| N | 0.012 |

Impact strength: 10 Kg.-m./cm.$^2$.

No pit or blow holes were observed and the result of the bending test was also satisfactory.

Example 3

Welding was performed using a type of composite electrode similar to that used in Example 2 (the composition thereof is given below), and the results are as follows:

| | Percent |
|---|---|
| $CaF_2$ | 20 |
| $AlF_3$ | 10 |
| $CaCO_3$ | 15 |
| $TiO_2$ | 20 |
| Fe-Mn | 15 |
| Fe-Si | 6 |
| Fe-Ti | 4 |
| $SiO_2$ | 10 |

Chemical composition of fusion joint metal:

| | Percent |
|---|---|
| C | 0.10 |
| Mn | 0.88 |
| Si | 0.23 |
| N | 0.019 |

Impact strength: 6.5 kg.-m./cm.$^2$

No blow holes were observed in X-ray examination and the result of the bending test was also satisfactory.

Example 4

Welding was performed under the same conditions as in Example 1 using a composite electrode (the composition thereof is given below) similar to that in FIG. 2 and the results obtained were as follows:

| | Percent |
|---|---|
| $CaF_2$ | 30 |
| $AlF_3$ | 5 |
| $MgCO_3$ | 25 |
| Al-Mg | 10 |
| Fe-Mn | 4 |
| $K_2O$ | 1 |
| $Na_2O$ | 1 |
| $SiO_2$ | 2 |
| Fe powder | 22 |

Chemical composition of fusion joint metal:

| | Percent |
|---|---|
| C | 0.12 |
| Mn | 1.05 |
| Si | 0.12 |
| Al | 0.36 |
| N | 0.020 |

Impact strength: 8 kg.-m./cm.$^2$.

No blow holes were observed in X-ray examination and the results of the bending test were satisfactory.

Example 5

Using an electrode with a wall thickness of 0.2 mm. and outer diameter of 3.2 mm., and comprising a composite electrode similar to that in FIG. 5 and containing powder of the same composition in both the inside core and outside layer, a single weld was laid on both sides of rimmed steel plate 12 mm. thick using 450 a. and 26 v.

The results are shown in Table 1 below. (Composition of the powder is given in Table 2).

TABLE 1

Composition of fusion joint steel (percent): C, 0.10; Mn, 0.92; Si 0.27; N, 0.020.

Impact strength: 6.5 kg.-m./cm.$^2$ (2 mm. v., 0° C.).

X-ray examination: No defect.

TABLE 2

Composition of powder

| | Percent |
|---|---|
| $CaF_2$ | 20 |
| $AlF_3$ | 10 |
| $CaCO_3$ | 25 |
| $TiO_2$ | 10 |
| Fe-Mn | 10 |
| Fe-Si | 5 |
| Fe-Ti | 10 |
| $Si-O_2$ | 10 |

Example 6

The electrode casing was mild steel and the construction of the electrode was similar to that in FIG. 3, the thickness of its inner cylindrical steel wall 5 being 0.6 mm., the thickness of its outer cylindrical steel wall 6 being 0.2 mm., its outer diameter being 3.2 mm., and the chemical composition of the powder being as noted below, said electrode was used for welding multiple layers on carbon steel 20 mm. thick and the results are given in the following Tables 3 and 4.

Inside core powder 7 composition (by weight):

| | Percent |
|---|---|
| Soda fluoride | 10 |
| Siliceous sand | 8 |

Fe-Mn ---------------------------------------- 22
Fe-Al ---------------------------------------- 5
Fe-Ti ---------------------------------------- 5
Outside layer powder 8 composition:
Soda fluoride -------------------------------- 20
Soda feldspar -------------------------------- 15
CaCO$_3$ ------------------------------------- 15

TABLE 3

Electric source D.C. dropping characteristics:
  Current—390–400 a.
  Arc voltage—24–26 v.
  Layer—4 layers, 7 passes
  X-ray examination—No defect

TABLE 4

Tensile strength—58.0 kg./cm.$^2$
Yield point—49.1 kg./cm.$^2$
Elongation—29%
Contraction—66%
Mean impact strength—11.3 kg.-m./cm.$^2$ 2 mm. v. 0° C.

We claim:

1. A consumable electrode used for arc welding of steel without need for shielding gas or the like from outside, the combination consisting essentially of:
  a steel casing; and
  a composite powder to be loaded into said casing in an amount constituting from 10% to 40% of the total weight of said electrode, said composite powder being further characterized in that at least 30% by weight, of said powder consists of the following three primary components, namely 10% to 60% of said primary components being at least one metal fluoride selected from a group of alkaline metal fluoride, alkaline earth metal fluoride, rare earth metal fluoride, aluminum fluoride and titanium fluoride, 5% to 25% of said primary components being at least one metal carbonate selected from a group of alkaline metal carbonates and alkaline earth metal carbonates and 10 to 50% of said primary components being at least one denitrodizing element selected from a group of Mg, Al, Zr, Ti, and an alloy and/or alloys deriving from the combination of any one of the four metal elements with the rest or others, the balance of said composite powder being any common flux powder usable in steel welding.

2. An electrode according to claim 1, in which said composite powder is divided into an inside core and an outside layer, the space of said core and layer being defined by walls within said casing, said spaces being packed with said composite powder.

3. An electrode according to claim 2, in which powder of identical composition is used for both said inside core and outside layer.

4. An arc welding layer electrode according to claim 2, in which the weight ratio of said inside core powder to outside layer powder is 20%/30% through 20/80% with more than 30% of the total powder comprising a mixture of metal fluoride and denitrodizing agent, and in which the amount of metal fluoride and metal carbonate in the outside layer of powder is greater than that in the inside core powder and the amount of denitrodizing element in the inside core powder is greater than that in the outside layer, whereby said electrode can be used without shielding gas or the like.

5. An electrode according to claim 1, in which the metal fluoride included in said powder is CaF$_2$, the metal carbonate is CaCO, and/or MgCO$_3$ and the denitrodizing agent is Al and/or Mg.

6. An electrode according to claim 1, in which at least 30% of said powder consists of a mixture of 30% through 60% of CaF$_2$, 5% through 25% of CaCO$_3$ and/or MgCO$_3$ and 10% through 30% of Al and/or Mg.

7. An electrode according to claim 1, in which at least one additional item is incorporated in said composite powder as auxiliary items, the item to be incorporated being at least one alloy element taken from the group consisting of Mn, Ni, Cr, Mo, B, V, and W, at least one deoxidizing agent taken from the group consisting of Fe-powder, Mn and/or Si, and at least one welding of flux taken from the group consisting of SiO$_2$, ZrO$_2$, Al$_2$O$_3$, MgO, MnO, MnO$_2$, K$_2$O, Na$_2$O and CaO, and Fe-powder.

8. An electrode according to claim 7, wherein at least one deoxidizing agent is taken from the group consisting of Mn and/or Si and approximately half of the denitrodizing agent comprises said deoxidizing agent.

References Cited
UNITED STATES PATENTS 3,272,963   9/1966   Wasserman et al. ____ 219—146
3,457,388   7/1969   Pokhodnya et al. ____ 219—146

FOREIGN PATENTS 1,052,714   12/1966   Great Britain.

JOSEPH V. TRUHE, Primary Examiner

L. A. ROUSE, Assistant Examiner